United States Patent
Doshi

(10) Patent No.: US 11,949,710 B2
(45) Date of Patent: Apr. 2, 2024

(54) SYSTEM AND METHOD FOR EFFICIENT EARLY INDICATION OF RANSOMWARE ATTACK FOR DAMAGE PREVENTION AND CONTROL

(71) Applicant: Dell Products L.P., Round Rock, TX (US)

(72) Inventor: Girish B. Doshi, Pune (IN)

(73) Assignee: Dell Products L.P., Round Rock, TX (US)

( * ) Notice: Subject to any disclaimer, the term of this patent is extended or adjusted under 35 U.S.C. 154(b) by 287 days.

(21) Appl. No.: 17/582,537

(22) Filed: Jan. 24, 2022

(65) Prior Publication Data

US 2023/0239321 A1 Jul. 27, 2023

(51) Int. Cl.
*H04L 29/06* (2006.01)
*H04L 9/40* (2022.01)

(52) U.S. Cl.
CPC ...... *H04L 63/1466* (2013.01); *H04L 63/1425* (2013.01)

(58) Field of Classification Search
CPC .......... H04L 63/1466; H04L 63/1425
See application file for complete search history.

(56) References Cited

U.S. PATENT DOCUMENTS

| | | | |
|---|---|---|---|
| 11,113,156 B2 * | 9/2021 | Brewer | G06F 11/2097 |
| 2007/0271431 A1 * | 11/2007 | Hwang | G06F 11/1471 |
| | | | 711/162 |
| 2021/0336968 A1 * | 10/2021 | Bender | H04L 63/145 |

OTHER PUBLICATIONS

Chen, Qian, et al. "Automated ransomware behavior analysis: Pattern extraction and early detection." Science of Cyber Security: Second International Conference, SciSec 2019, Nanjing, China, Aug. 9-11, 2019, Revised Selected Papers 2. Springer International Publishing, 2019. (Year: 2019).*

* cited by examiner

*Primary Examiner* — Shawnchoy Rahman
(74) *Attorney, Agent, or Firm* — Chamberlain, Hrdlicka, White, Williams & Aughtry; Aly Z. Dossa

(57) ABSTRACT

In general, one or more embodiments of the invention relates to systems and methods for detecting ransomware attacks earlier and closer to the time of attack. The ransomware attack can be detect by determining a change rate of data blocks between snapshots. The ransomware attack can also be detected by determining the pattern of changes in the blocks deviates from a normal pattern. By making these determinations, a quick identification of possible ransomware attacks can be made and other methods of mitigating the attack can be deployed when they are may still be useful to mitigate potential damage to a user's data.

20 Claims, 4 Drawing Sheets

SYSTEM AND METHOD FOR EFFICIENT EARLY INDICATION OF RANSOMWARE ATTACK FOR DAMAGE PREVENTION AND CONTROL

BACKGROUND

As networking and communication technologies advance, there is an increased need for providing datacenters better security and monitoring against cyber-attacks. One type of attack: ransomware attacks, are becoming increasingly common. A ransomware attack is a type of malware that threatens to publish a victim's sensitive data or perpetually block access to their sensitive data unless a ransom is paid. In many cases the ransomware attack comprises of encrypting or altering in another way the victim's files, making them inaccessible without receiving a decryption key from the attacker.

SUMMARY

Embodiments of the present invention provide a method, computer program product, and system for monitoring data to determine if a ransomware attack is in progress against the monitored data. The method and system monitor the data for changes in the data. If the rate of change of the data is greater than a threshold, the method and system performs the appropriate action to mitigate the attack.

In accordance with the first aspect, the present invention provides a method for detecting a ransomware attack. The method includes enabling changed block tracking of a data storage that includes a plurality of data blocks. The method then takes snapshots of the plurality of data blocks at multiple times. A rate of change between at least two snapshots of the plurality of data blocks and the pattern of changes between the at least two snapshots of the plurality of data blocks is determined. If the determined rate of change is greater than a threshold and/or the pattern deviates by greater than a threshold from a normal pattern, the method causes the data blocks to be scanned for ransomware.

In accordance with the second aspect, the present invention provides an electronic device comprising a data storage that includes a plurality of blocks, a data protection manager that monitors the data storage and includes a processor, and a memory having computer program instructions stored thereon. The processor executes the computer program instructions in the memory to perform a method which includes enabling changed block tracking of a data storage that includes a plurality of data blocks. The method then takes snapshots of the plurality of data blocks at multiple times. A rate of change between at least two snapshots of the plurality of data blocks and the pattern of changes between the at least two snapshots of the plurality of data blocks is determined. If the determined rate of change is greater than a threshold and/or the pattern deviates by greater than a threshold from a normal pattern, the method will cause the data blocks to be scanned for ransomware.

In accordance with the third aspect, it provides a computer program product, which is tangibly stored in a non-transitory computer storage medium and includes machine-executable instructions; the machine-executable instructions, when executed by a device, causes the device to execute a method. The method includes enabling changed block tracking of a data storage that includes a plurality of data blocks. The method then takes snapshots of the plurality of data blocks at multiple times. A rate of change between at least two snapshots of the plurality of data blocks and the pattern of changes between the at least two snapshots of the plurality of data blocks is determined. If the determined rate of change is greater than a threshold and/or the pattern deviates by greater than a threshold from a normal pattern, the method causes the data blocks to be scanned for ransomware.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
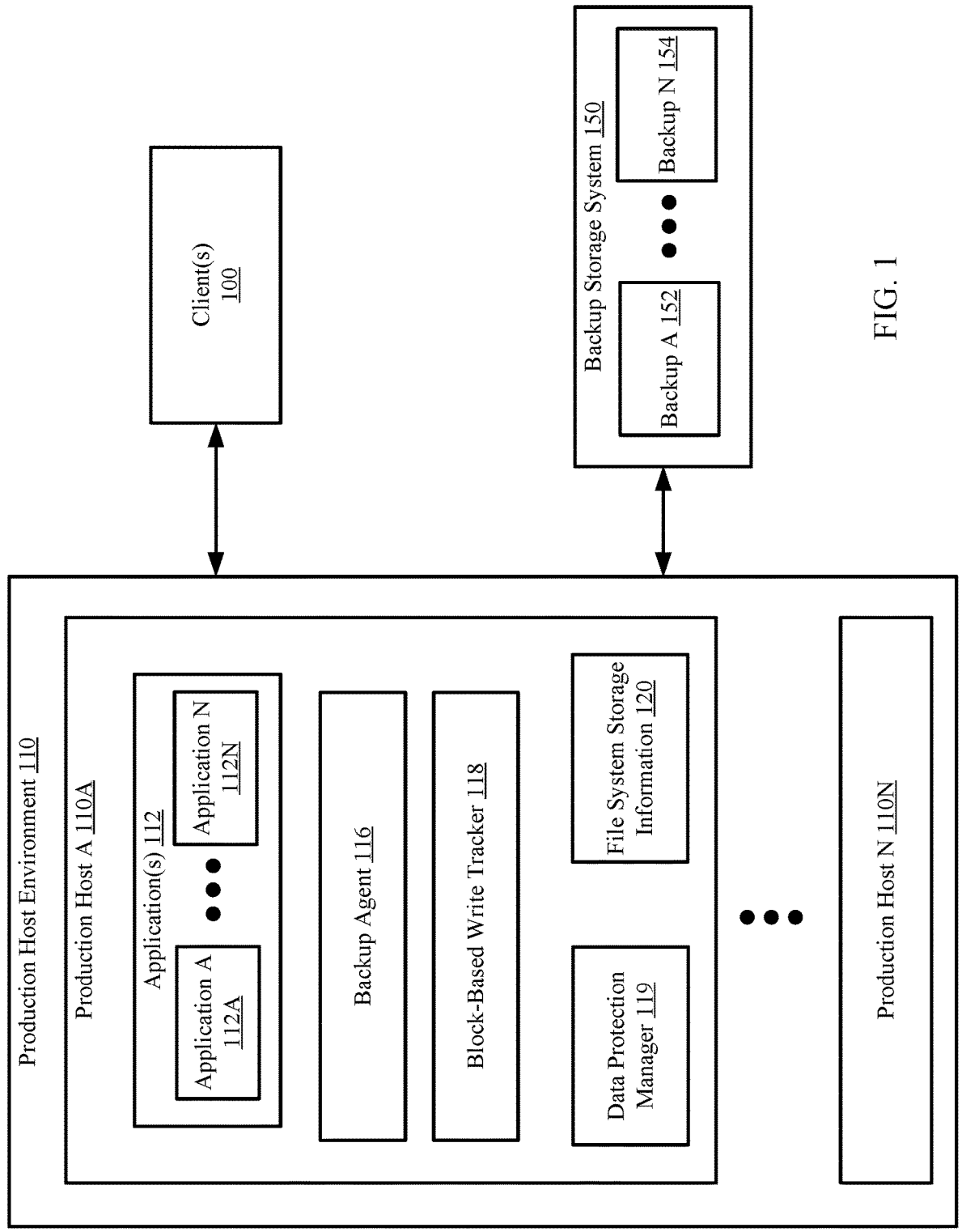
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

When ransomware attacks occur, data in either or both backup storage and in other forms of storage including working storage is altered. This may comprise of altering metadata, file headers, and/or full or partial file content corruption such as encrypting the file. When any of these are corrupted by a ransomware attack, the backup data or working data is significantly altered such as a significant change in file size (for example, a word document changing from 2 megabytes (MB) to 130 bytes).

While means for detecting and mitigating, ransomware are available, they are costly and require significant time to scan the data. Further, they are often only employed when a ransomware attack is suspected or at best during infrequent backups, which can potentially expose the backup data to the ransomware attack. By the time the ransomware is detected, it is often too late to prevent damage and/or stop potential spreading of the ransomware, such as to backup files.

In general, one or more embodiments of the invention relates to systems and methods for detecting ransomware attacks earlier and closer to the time of attack. The ransomware attack can be detected by determining a change rate of data blocks between snapshots. The ransomware attack can also be detected by determining if the pattern of changes in the blocks deviates from a normal pattern. By making these determinations, a quick identification of possible ransomware attacks can be made and other methods of mitigating the attack can be deployed when the method of mitigating the attack might still be useful to mitigate potential damage to a user's data.

FIG. 1 shows a diagram of a system in accordance with one or more embodiments of the invention. The system may include one or more clients (100), a production host environment (110), and a backup storage system (150). The system may include additional, fewer, and/or different components without departing from the invention. Each component may be operably connected to any of the other components via any combination of wired and/or wireless connections. Each of the aforementioned components is discussed below.

In one or more embodiments of the invention, the production host environment (110) is a grouping of production hosts (110) that each provide services to the clients (100). Each production host (110A, 110N) in the production host environment (110) includes applications (112), a backup agent (116), a block-based write tracker (118), a data protection manager (119), and a file system storage information (120). The production hosts (110A, 110N) may include additional, fewer, and/or different components without departing from the invention. Each of the aforementioned components illustrated in FIG. 1 are discussed below.

In one or more embodiments of the invention, a production host (110A, 110N) hosts one or more applications (112). In one or more embodiments of the invention, the applications (112) perform services for clients (e.g., 100). The services may include writing, reading, and/or otherwise modifying data that is stored in the production host (110A, 110N). The applications (112) may each include functionality for writing data to the production host (110A, 110N) and for notifying the block based write tracker (118) of data written to a persistent storage system in the production host (110A, 110N). The applications may be, for example, instances of databases, email servers, and/or other applications. The applications (112A, 112N) may host other types of applications without departing from the invention.

In one or more of embodiments of the invention, each application (112A, 112N) is implemented as computer instructions, e.g., computer code, stored on a persistent storage that when executed by a processor(s) of the production host (e.g., 110A, 110N) cause the production host (110A, 110N) to provide the functionality of the applications (e.g., 112A, 112N) described throughout this application.

In one or more embodiments of the invention, the production host (110A, 110N) further includes a backup agent (116). The backup agent (116) may include functionality for generating backups of a file system. In one or more embodiments of the invention, a file system is an organizational data structure that tracks how data is stored and retrieved in a system (e.g., in persistent storage of a production host (110A, 110N) or of the production host environment (110)). The file system may specify references to assets and any data blocks associated with each asset. An asset may be an individual data object in the file system. An asset may be, for example, a file. The backup generated may include a copy of the assets for one or more specified applications associated with a specified point in time.

In one or more embodiments of the invention, the backup agent (116) may further include functionality for generating block-based backups. In one or more embodiments of the invention, a block-based backup is a backup generated by copying data blocks in a persistent storage system (not shown) of a production host (e.g., 110A, 110N). The data blocks may be stored contiguously or non-contiguously in the persistent storage system. In other words, data blocks are stored in portions of a persistent storage system that are physically located near each other (e.g., next to each other). The storage location of each data block in the production host may be specified in the file system storage location (120) (discussed below). The block-based backup may be generated via any known or later discovered method without departing from the invention.

In one or more embodiments of the invention, the backup agent (116) may generate the backups based on backup policies implemented by the backup agent (116). The backup policies may specify a schedule in which the applications (e.g., 112A, 112N) are to be backed up. The backup agent (116) may be triggered to execute a backup in response to a backup policy. Alternatively, one or more of the backups (152, 154) may be generated in response to a backup request triggered by the client(s) (100). The backup request may specify the applications to be restored.

In one or more embodiments of the invention, the backup agent (116) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup agent (116) described throughout this application.

In one or more embodiments of the invention, the backup agent (116) is implemented as computer instructions, e.g., computer code, stored on a persistent storage that when executed by a processor of the production host (e.g., 110A, 110N) causes the production host (110A, 110N) to provide the functionality of the backup agent (116) described throughout this application.

In one or more embodiments of the invention, the production host (110A, 110N) further includes a block-based write tracker (e.g., 118). In one or more embodiments of the invention, the block-based write tracker (118) tracks the changed portions of the persistent storage system used in the production host (110A, 110N). The block-based write tracker (220) tracks such changed portions by maintaining a block-based change list that specifies each data block in the persistent storage system that has been changed since a most recent block-based backup.

In one or more embodiments of the invention, the block-based write tracker (118) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the block-based write tracker (118) described throughout this application.

In one or more embodiments of the invention, the block-based write tracker (118) is implemented as computer instructions, e.g., computer code, stored on a persistent storage that when executed by a processor of a production host (e.g., 110A, 110N) causes the production host (110A, 110N) to provide the functionality of the block-based write tracker (118) described throughout this application.

In one or more embodiments of the invention, the data protection manger (119) is a data structure processor that monitors data on the backup storage system (150) and other storage areas including those of the host and/or clients (100). In one or more embodiment of the invention the data protection manager (119) performs the method of FIGS. 2 and 3. The data protection manager (119) insures that the data on the backup storage system (150) and other areas are free from corruption and attack. The data protection manger (119) can perform more or less functions and may be a separate processor or may be part of other components of the production Host (110A-110N) such as the backup agent (116), block-based write tracker (118) and/or file system storage information (120).

In one or more embodiments of the invention, the data protection manager (119) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the data protection manager (119) described throughout this application.

In one or more embodiments of the invention, the data protection manager (119) is implemented as computer instructions, e.g., computer code, stored on a persistent storage that when executed by a processor of a production host (e.g., 110A, 110N) causes the production host (110A, 110N) to provide the functionality of the data protection manager (119) described throughout this application.

In one or more embodiments of the invention, the file system storage information (120) is a data structure that specifies each asset in the file system and a storage location of the data blocks associated with the asset in the persistent storage system. The file system storage information (120) may include entries that each specify an asset of the file system, the data blocks associated with the asset, and the physical or logical storage location of each data block. The storage location may be, for example, an address (e.g., physical, logical, etc.) associated with a portion of a physical storage device.

Figure 4:
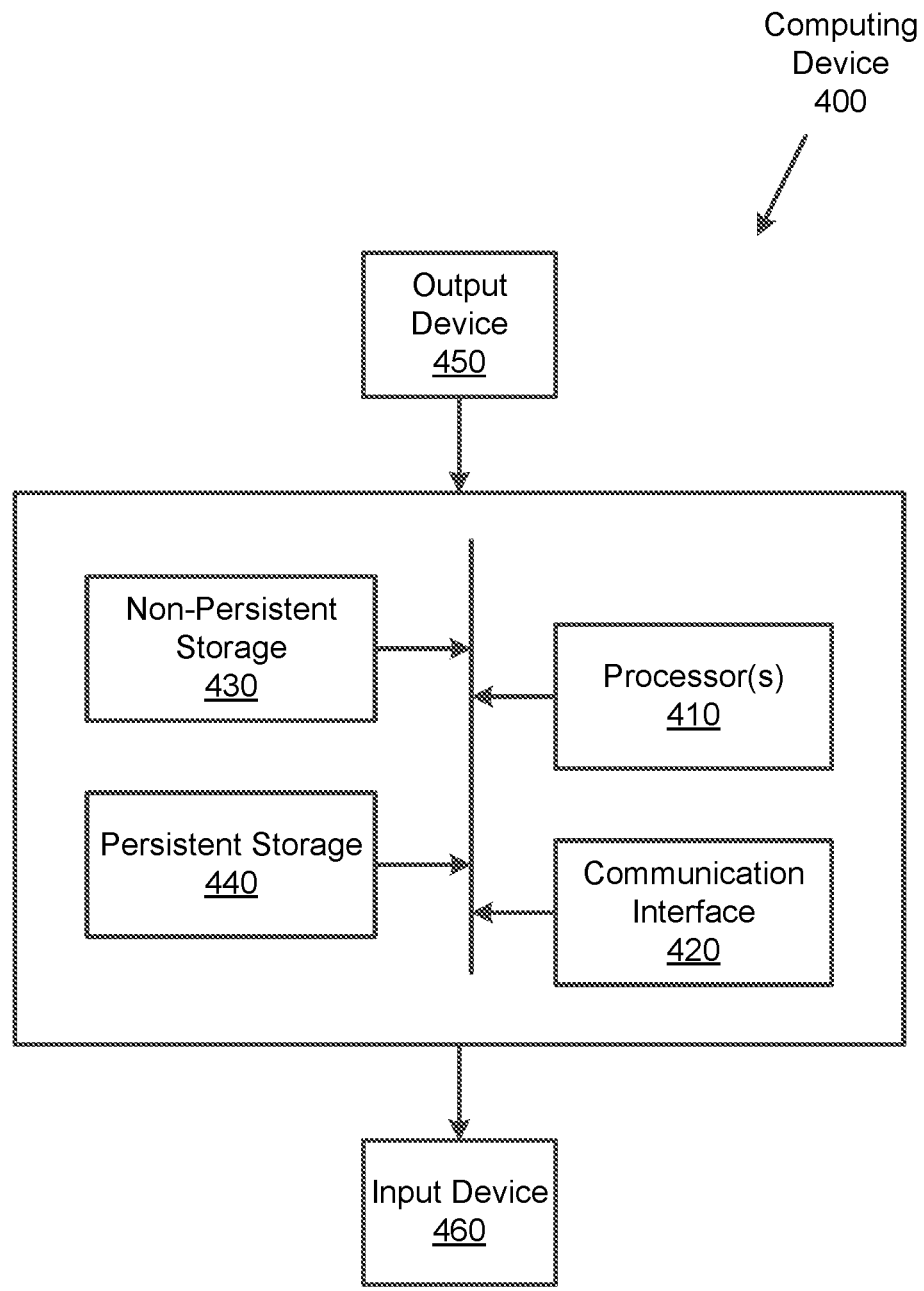
FIG. 4 shows a diagram of a computing device in accordance with one or more embodiments of the invention.

In one or more embodiments of the invention, the production host (110A, 110N) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (110A, 110N) described throughout this application.

In one or more embodiments of the invention, the production host (110A, 110N) is implemented as a logical device. The logical device may utilize the computing resources of any number of computing devices and thereby provide the functionality of the production host (110A, 110N) described throughout this application.

In one or more embodiments of the invention, the client(s) (100) utilize services provided by the production host (110). Specifically, the client(s) (100) may utilize the applications in the applications (112A, 112N) to obtain, modify, and/or store data. The data may be generated from applications hosted in the application (112).

In one or more embodiments of the invention, a client (100) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client (100) described throughout this application.

In one or more embodiments of the invention, the client(s) (100) are implemented as a logical device. The logical device may utilize the computing resources of any number of computing devices and thereby provide the functionality of the client(s) (100) described throughout this application.

In one or more embodiments of the invention, the backup storage system (150) stores backups of a file system. The file system may include application data of the applications (e.g., 112). The backups may further include application dependency information. In one or more embodiments of the invention, a backup is a full or partial copy of one or more applications (e.g., 112A, 112N). The copy may include the application data and/or application dependency information.

In one or more embodiments of the invention, a backup (152, 154) in the backup storage system (150) is an incremental backup. In one or more embodiments of the invention, an incremental backup is a backup that only stores changes in the persistent storage system that were made after a previous backup in the backup storage system. In contrast, a full backup may include all of the data in the persistent storage system (120) without taking into account when the data had been modified or otherwise written to the persistent storage system (120).

In one or more embodiments of the invention, if the data in the file system is to be restored to a point in time associated with an incremental backup, the required backups needed to perform the restoration include at least: (i) the incremental backup, (ii) a full backup, and (iii) the intermediate backups (if any) that are associated with points in time between the full backup and the incremental backups. In this manner, the required backups collectively include all of the data of the persistent storage system (120) at the requested point in time.

In one or more embodiments of the invention, each backup (152, 154) in the backup storage system (150) is either a file-system backup or a block-based backup. In one or more embodiments of the invention, a file-system backup is a backup generated by identifying the assets in the file system and generating a copy of all assets (or a portion thereof). In contrast, a block-based backup is generated by identifying the data blocks in the persistent storage system of a production host (e.g., 110A, 110N) and generating copies of all data blocks (or a portion thereof). The data in a file-system backup and of a block-based backup may be similar or different without departing from the invention.

In one or more embodiments of the invention, the backup storage system (150) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device causes the computing device to perform the functionality of the backup storage system (150) described throughout this application.

In one or more embodiments of the invention, the backup storage system (150) is implemented as a logical device. The logical device may utilize the computing resources of any number of computing devices and thereby provide the functionality of the backup storage system (150) described throughout this application.

Figure 2:
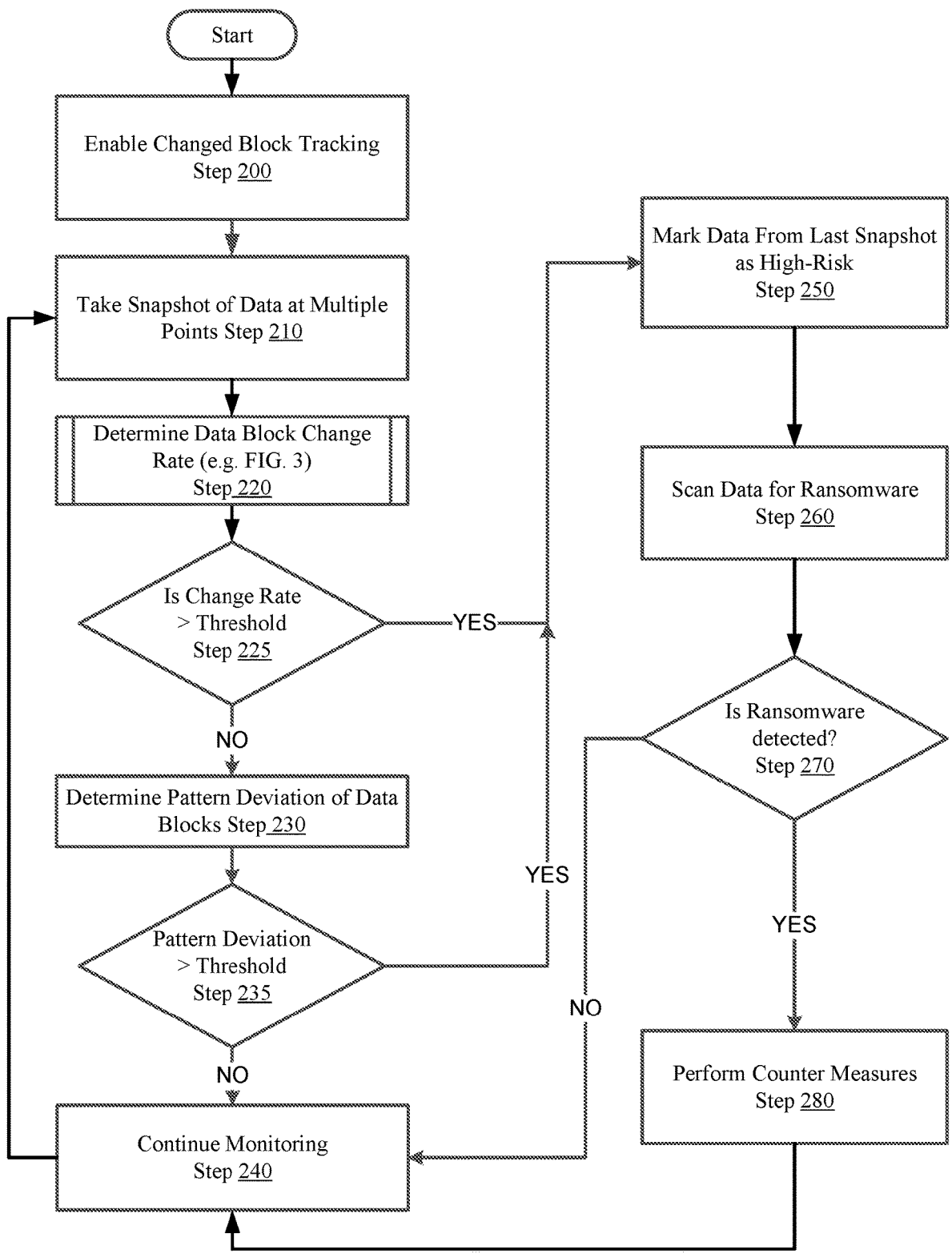
FIG. 2 shows a flowchart of a method for determining if ransomware is present in accordance with one or more embodiments of the invention.
Figure 3:
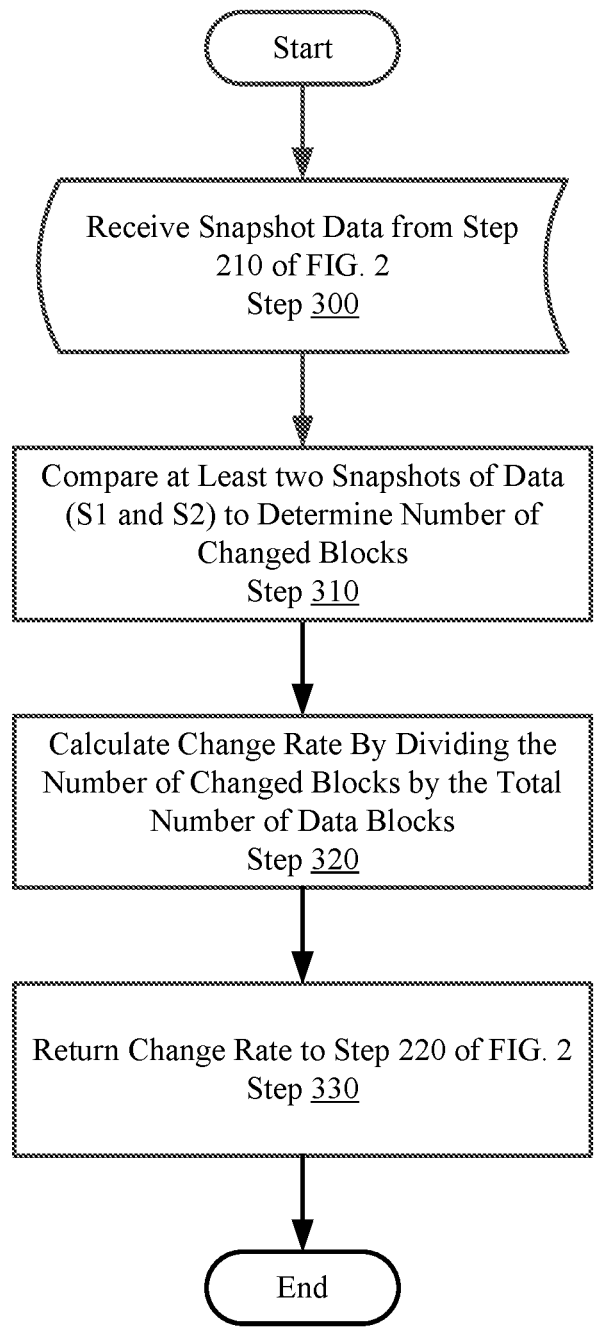
FIG. 3 shows a flowchart of a method for determining a change rate in accordance with one or more embodiments of the invention.

FIGS. 2 and 3 show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2 and 3 may be performed in parallel with any other steps shown in FIGS. 2 and 3 without departing from the scope of the invention.

FIG. 2 shows a flowchart for identifying ransomware using changed block tracking. The method shown in FIG. 2 may be performed by a data protection manager (119) which can be a separate component of the production host or can be part of other components such as, for example, the backup agent (116, FIG. 1) when performed during a backup or the block-based write tracker (118) when performed at other times. Other components of the system illustrated in FIG. 1, such as the clients (100) the applications (112), and/or production host (110N) may perform the method of FIG. 2 without departing from the invention.

In step 200, changed block tracking is enabled. This can occur during a backup request, or at any-time the system can potentially be exposed to an attack. The request to enable changed block tracking may originate from an administrator, an external cybersecurity system, or any other entity in the production host. In some embodiments it may be directed only towards a portion of stored data used for functions that are considered to be at higher risk, while leaving the rest of the storage unmonitored.

In step 210 snapshots are taken of the data blocks at multiple points. The snapshots are taken at a regular interval. In at least one embodiment they are taken when a daily or more frequent backup is performed. In at least another embodiment they are taken at specific predefined periods of time such as every hour, every twelve hours, every day, or other periods of time that are useful for the specific type of data and/or the perceived risk of cyber-attack.

The snapshots may be of all data on the production host or only the data related to the changed blocks since the last snapshot. Further, the snapshots may include other metadata such as number that indicates the amount of blocks that have been altered.

In step 220 the system determines the data block change rate by looking at the difference between at least two snapshots. The determination is described in more detail in FIG. 3. The data block change rate can be a simple number such as 0.25 or can be in the form of a percent 3%. Other methods of determining a data block change rate can be used and the invention is not limited to that described in FIG. 3.

In step 225, the data block change rate is compared to a threshold. This threshold can be specific to the system, security policy, and/or type of operation. For a system/operation where little change from snapshot to snapshot is expected, the rate may be as low as 2%, other operations that are expected to have more change may have higher thresholds/percentages. As an example, in a system where normal change between snapshots is on average 2%, a threshold of 10% may be set. This would be a clear indication that unusual activity is/has occurred. Other thresholds can be conceived and, in general, it is desirable to set the threshold high enough that normal activity and deviation would not alarm the system while the threshold is low enough to detect a cyber-attack prior to significant un-reversible damage occurring.

If in step 225, it is determined that the change rate is greater than the threshold, the method continues to step 250 where the data (e.g., the data in the snapshot) is marked as high risk. Otherwise, if in step 225, it is determined that the change rate is less than the threshold, the method continues to step 230.

In step 230 it is determined if the change of data is different or deviates from a normal pattern of change. The normal pattern can be determined by looking at an average of the snapshots over a significant period of time and determining how the blocks of data on average have changed. In other embodiments, the normal pattern can be specific to the type of operation being performed, such as with a backup where any changes in the pattern of the blocks is expected to be according to the normal parameters of performing a backup.

In at least one embodiment the change in the pattern of the blocks can be determined by looking at such things as the spread and/or density of the blocks. In other embodiments patterns such as the distribution of changed blocks can be determined in terms of offset and length of continuous chains of blocks. Such a change could be that in a backup the number of blocks generally increases for database files while staying generally the same for an executable file. Other changes and/or patterns can be tracked as is useful to determining for a particular system and/or application that abnormal changes in the pattern of the blocks has occurred.

In step 235 it is determined if the deviation of the pattern of change of the blocks is greater than a threshold. This threshold can be, in at least one embodiment, based on standard deviations, which are calculated using known statistical methods. For example, the threshold could be that the change is more than one standard deviations from average or normal patterns of change of the specific data blocks. Other thresholds and methods to determine if the pattern of change of the data blocks indicates a possible attack can be used and conceived of according to this invention. One such method would be the use of machine learning to determine when a pattern deviates in such a way as to indicate a ransomware attack.

If it is determined that the pattern deviates by more than the threshold, the method also continues to step 250 where the data from the last snapshot is marked as high risk. If it is determined that the pattern does not deviate by more than the threshold, then in step 240, the system/data blocks are continued to be monitored either until the specific operation being monitor completes or a client or user sends a command to stop changed block tracking. The continued monitoring in step 240 includes returning to step 210 and beginning the monitoring process again.

The method of FIG. 2. shows using both the data block change rate (e.g. steps 220 and 225) and pattern deviation of data blocks (e.g. steps 230 and 235) to determine if ransomware is present. In other embodiments only the data block change rate (e.g. steps 220 and 225) is used or only the pattern deviation of data blocks is used (e.g. steps 230 and 235) and those steps not used can be skipped (for example if only data block change rate is used then steps 230 and 235 are skipped). Other combinations with other scanning means can also be used and when ransomware is detecting the methods proceed to step 250.

Returning to step 250, when either the change rate of the data blocks or pattern deviation of the data blocks is greater than a threshold in steps 225 and 235, the monitored data that has such metrics, is then marked as high risk. Appropriate action could be then taken with regards to that data, such as isolating it from other areas of the system and/or freezing backup data that has been previously collected for those blocks of data.

In at least one embodiment, data that has been marked as high-risk is stopped from being copied to the backup storage. The disc that the potentially harmful data is mounted on, can be carved form the snapshot and mounted on, for example, a scanning host to perform scanning in step 260.

In step 260, the data that has been labeled as high-risk in step 250, is scanned. This can be basic scanning or more detailed scanning to determine if a ransomware attack is occurring. Scanning, in a non-limiting example, can comprise of having a disc labeled as being potentially high risk mounted to a scanning host. Other methods of detecting and scanning for ransomware could be used.

In at least one embodiment, the scanning host scans common unstructured files which are commonly targets for cyber-attacks. Such files are: office documents, PDFs, text files, etc. The cyber sense host looks for indicators in the potentially corrupted files, such as change in file type/extensions, file deletion, encryption of files, file version similarity and file entropy, which might indicate the presence of a cyber-attack such as ransomware attacks.

In step 270, the method analyzes the result of the scanning in method 260. If ransomware or other cyberattacks are detected, then the method performs appropriate counter measures in step 280. Otherwise the mark of the data as high-risk is removed and the monitoring continues in step 240.

In step 280, appropriate counter measures are performed. For ransomware, this might comprise of deleting or isolating the affected data, and replacing it with data from an air gap backup or a backed up data which is ensured to have not been corrupted. Other known measures can be taken. Optionally, appropriate notifications can be given to clients, users, system administrators, and/or law enforcement as needed and/or according to a specific system's security policies. This may in at least some embodiments also include the immediate scanning of all data in a particular system that may have been affected, due to its proximity to the corrupted blocks or share network connections, but not detected by steps 225 and 235.

The method of FIG. 2 may end following either steps 235, 270 or 280; alternatively, the method may continue via step 240. The aforementioned process may be performed each time an operation is identified. A client or user may determine that for a particular benign operation, that the threshold in either step 225 or 235 will be exceeded. In which case, the client or user will signal the system to disable changed block tracking and the method will end and monitoring will stop. In other embodiments the systems continues to perform the method of FIG. 2, continuously.

FIG. 3 shows a flowchart for performing calculating the data block change rate in step 220 of FIG. 2. The method shown in FIG. 3 may be performed by a data protection manager (119) which can be a separate component of the production host or can be part of another components such as, for example, the backup agent (116, FIG. 1) when performed during a backup or the block-based write tracker (118) when performed at other times. Other components of the system illustrated in FIG. 1, such as the clients (100) the applications (112), and/or production host (110N) may perform the method of FIG. 3 without departing from the invention.

In step 300, snapshot data from step 210 of FIG. 2 is received. The data should comprise of at least two snapshots, which in at least one embodiment are the last two snapshots taken. Other combinations of different amounts and specific snapshots can be used to perform the method of FIG. 3.

In step 310, the at least two snapshots are compared. The comparisons comprises of detecting blocks which have been changed. In other embodiments, the comparisons can comprise of other groupings of data such as clusters, files, and bytes, as is deemed useful for a particular application and/or system. The method determines based on the comparison the number of blocks that have been changed and proceeds to step 320.

In step 320, the change rate of the blocks of data is determined by taking the total number of blocks changed in step 310 and dividing it by the total number of blocks in the specific group of blocks scanned. The total number of blocks in the specific group of blocks scanned can be the total number of blocks on an entire physical storage such as a hard drive or an entire virtual storage/drive. Alternatively the total number of blocks in the specific group of blocks scanned can be for less than the total number of blocks in a physical or virtual storage medium.

The result of the determining should be between zero and one and can be returned in step 330 as the change rate of step 220 in FIG. 2. The result can also be converted to a percentage in at least some embodiments by multiplying it by 100 to obtain a percentage of the total blocks that have been changed. For example if there are 1000 blocks and 200 have been changed, the method would return a data block change rate of 0.2 or 20%.

The method of FIG. 3 may end following step 330.

As discussed above, embodiments of the invention may be implemented using a computing device. FIG. 4 shows a diagram of a computing device in accordance with one or more embodiments of the invention. The computing device (400) may include one or more computer processors (410), non-persistent storage (430) (e.g., volatile memory, such as random access memory (RAM), cache memory), persistent storage (440) (e.g., a hard disk, an optical drive such as a compact disk (CD) drive or digital versatile disk (DVD) drive, a flash memory, etc.), a communication interface (420) (e.g., Bluetooth interface, infrared interface, network interface, optical interface, etc.), input devices (460), output devices (450), and numerous other elements (not shown) and functionalities. Each of these components is described below.

In one embodiment of the invention, the computer processor(s) (410) may be an integrated circuit for processing instructions. For example, the computer processor(s) may be one or more cores or micro-cores of a processor. The computing device (400) may also include one or more input devices (460), such as a touchscreen, keyboard, mouse, microphone, touchpad, electronic pen, or any other type of input device. Further, the communication interface (420)

may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (450), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (410), non-persistent storage (430), and persistent storage (440). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

In general, one or more embodiments of the invention allow for detecting ransomware attacks earlier and closer to the time of attack. The ransomware attack can be detect by determining a change rate of data blocks between snapshots. The ransomware attack can also be detected by determining the pattern of changes in the blocks deviates from a normal pattern. By making these determinations, a quick identification of possible ransomware attacks can be made and other methods of mitigating the attack can be deployed when they may still be useful to mitigate potential damage to a user's data.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for detecting a ransomware attack, comprising:
    enabling changed block tracking of a data storage comprising of a plurality of data blocks;
    taking snapshots of the plurality of data blocks at multiple times;
    determining a rate of change between at least two snapshots of the plurality of data blocks;
    determining a pattern of changes between the at least two snapshots of the plurality of data blocks; and
    scanning the plurality of data blocks for ransomware when the determined rate of change between the at least two snapshots of the plurality of data blocks is greater than a threshold and/or the determined pattern of changes between the at least two snapshots of the plurality of data blocks deviates by more than a threshold from a normal pattern of changes of the plurality of data blocks.

2. The method of claim 1, wherein the rate of change between the at least two snapshots of the plurality of data blocks is determined by calculating the difference between the at least two snapshots of the plurality of data blocks to determine the number of data blocks that have changed and dividing the difference by the total number of data blocks in the at least two snapshots to obtain the rate of change between the at least two snapshots of the plurality of data blocks.

3. The method of claim 1, wherein determining if the pattern of changes between the at least two snapshots of the plurality of data blocks deviates by a threshold from the normal pattern of changes of the plurality of data blocks comprises determining the number of standard deviations that the current pattern of changes between the at least two snapshots differs from a historical pattern of changes.

4. The method of claim 1, wherein the method is performed by a data protection manager during backup of the data blocks.

5. The method of claim 1, wherein the snapshots are taken of active data.

6. The method of claim 1, wherein the snapshots are taken at set intervals of time.

7. The method of claim 6, wherein the set intervals of time are once a day.

8. An electronic device comprising:
    a data storage that comprises of a plurality of blocks;
    a data protection manager that monitors the data storage and includes a processor; and
    a memory having computer program instructions stored thereon, the processor executing the computer program instructions in the memory to perform a method comprising of:
        enabling changed block tracking of the data storage;
        taking snapshots of the plurality of data blocks at multiple times;
        determining a rate of change between at least two snapshots of the plurality of data blocks;
        determining a pattern of changes between the at least two snapshots of the plurality of data blocks; and
        scanning the plurality of data blocks for ransomware, when the determined rate of change between the at least two snapshots of the plurality of data blocks is greater than a threshold and/or the determined pattern of changes between the at least two snapshots of the plurality of data blocks deviates by more than a threshold from a normal pattern of changes of the plurality of data blocks.

9. The electronic device of claim 8, wherein the rate of change between the at least two snapshots of the plurality of data blocks is determined by calculating the difference between the at least two snapshots of the plurality of data blocks to determine the number of data blocks that have changed and dividing the difference by the total number of data blocks in the two snapshots to obtain the rate of change between the at least two snapshots of the plurality of data blocks.

10. The electronic device of claim 9, wherein determining if the pattern of changes between the at least two snapshots of the plurality of data blocks deviates by a threshold from the normal pattern of changes of the plurality of data blocks comprises determining the number of standard deviations that the current pattern of changes between the at least two snapshots differs from a historical pattern of changes.

11. The electronic device of claim 8, wherein the method is performed by the data protection manager during backup of data.

12. The electronic device of claim 8, wherein the snapshots are taken of active data.

13. The electronic device of claim 8, wherein the snapshots are taken at set intervals of time.

14. The electronic device of claim 13, wherein the set intervals of time are once a day.

15. A computer program product, which is tangibly stored in a non-transitory computer storage medium and includes machine-executable instructions, the machine-executable instructions, when executed by a device, causing the device to execute a method comprising:
    enabling changed block tracking of a data storage comprising of a plurality of data blocks;
    taking snapshots of the plurality of data blocks at multiple times;
    determining a rate of change between at least two snapshots of the plurality of data blocks;
    determining a pattern of changes between the at least two snapshots of the plurality of data blocks; and
    scanning the plurality of data blocks for ransomware, when the determined rate of change between the at least two snapshots of the plurality of data blocks is greater than a threshold and/or the determined pattern of changes between the at least two snapshots of the plurality of data blocks deviates by more than a threshold from a normal pattern of changes of the plurality of data blocks.

16. The computer program of claim 15, wherein the rate of change between the at least two snapshots of the plurality of data blocks is determined by calculating the difference between the at least two snapshots of the plurality of data blocks to determine the number of data blocks that have changed and dividing the difference by the total number of data blocks in the at least two snapshots to obtain the rate of change between the at least two snapshots of the plurality of data blocks.

17. The computer program of claim 15, wherein determining if the pattern of changes between the at least two snapshots of the plurality of data blocks deviates by a threshold from the normal pattern of changes of the plurality of data blocks comprises determining the number of standard deviations that the current pattern of changes between the at least two snapshots differs from a historical pattern of changes.

18. The computer program of claim 15, wherein the method is performed during backup of data.

19. The computer program of claim 15, wherein the snapshots are taken of working data.

20. The computer program of claim 15, wherein the snapshots are taken at set intervals of time.

* * * * *